United States Patent [19]

Chance et al.

[11] Patent Number: 4,539,576

[45] Date of Patent: Sep. 3, 1985

[54] ELECTROLYTIC PRINTING HEAD

[75] Inventors: Dudley A. Chance, Danbury, Conn.; Michael Sampogna, Fishkill, N.Y.

[73] Assignee: International Business Machines Corporation, Armonk, N.Y.

[21] Appl. No.: 562,501

[22] Filed: Dec. 16, 1983

[51] Int. Cl.³ .......... G01D 15/06

[52] U.S. Cl. .......... 346/165; 346/155

[58] Field of Search .......... 346/155, 165, 162-164, 346/153.1, 74.5, 76 PH

[56] References Cited

U.S. PATENT DOCUMENTS

| | | | |
|---|---|---|---|
| 3,713,169 | 1/1973 | Turner | 346/165 |
| 3,718,936 | 2/1973 | Rice, Jr. | 346/155 |
| 4,476,473 | 10/1984 | Wako | 346/155 |
| 4,502,063 | 2/1985 | Acciai et al. | 346/155 |

OTHER PUBLICATIONS

Wilbur, "Electrothermal Print Head", IBM Tech. Disc. Bul., vol. 23, No. 9, pp. 4305-4306, Feb. '81.

Powell et al., "High Res. Matrix Print Element Structure and Method", IBM Tech. Disc., vol. 24, No. 10, pp. 5075-5077, Mar. '82.

*Primary Examiner*—E. A. Goldberg
*Assistant Examiner*—Fred L. Kampe
*Attorney, Agent, or Firm*—Pollock, Vande Sande and Priddy

[57] ABSTRACT

An electrolytic print head comprises a plurality of styli (16, 18) between electrically insulative laminae (38, 42, 48, 38', 42', 48') which space the styli from planar reference electrodes (20, 22, 24). The styli and reference electrodes are fabricated of a mixture of ruthenium dioxide and corrosion resistant glass, and the insulative laminae are fabricated of corrosion resistant glass. The method of manufacture of the print head facilitates use of styli and reference electrodes requiring high temperature processing prior to deposition of metal conductor tracks for the styli and reference electrodes.

17 Claims, 15 Drawing Figures

FIG 12
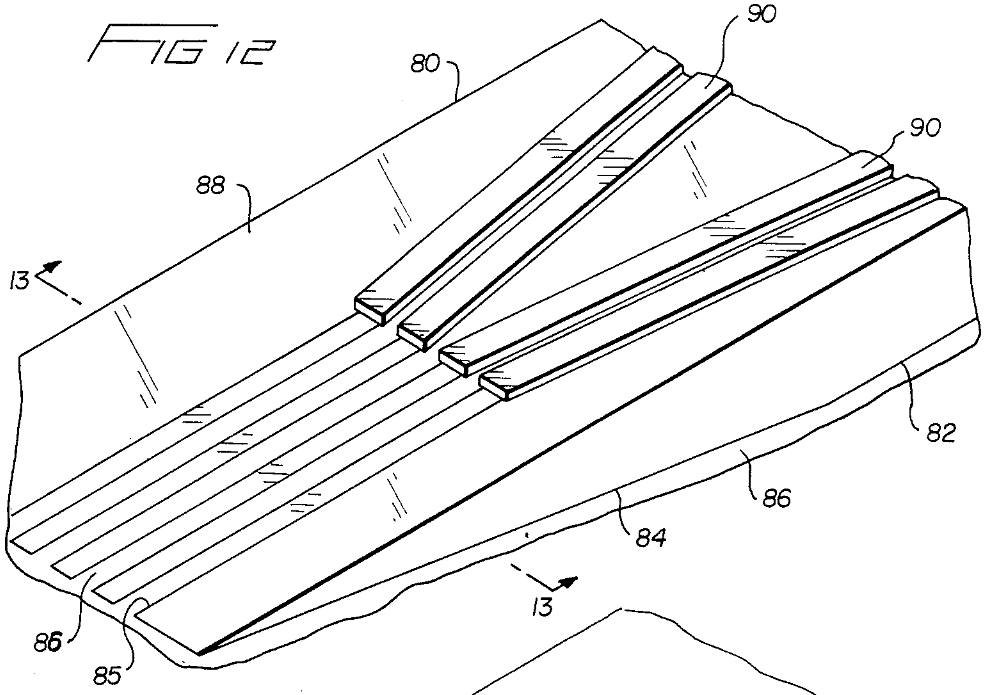
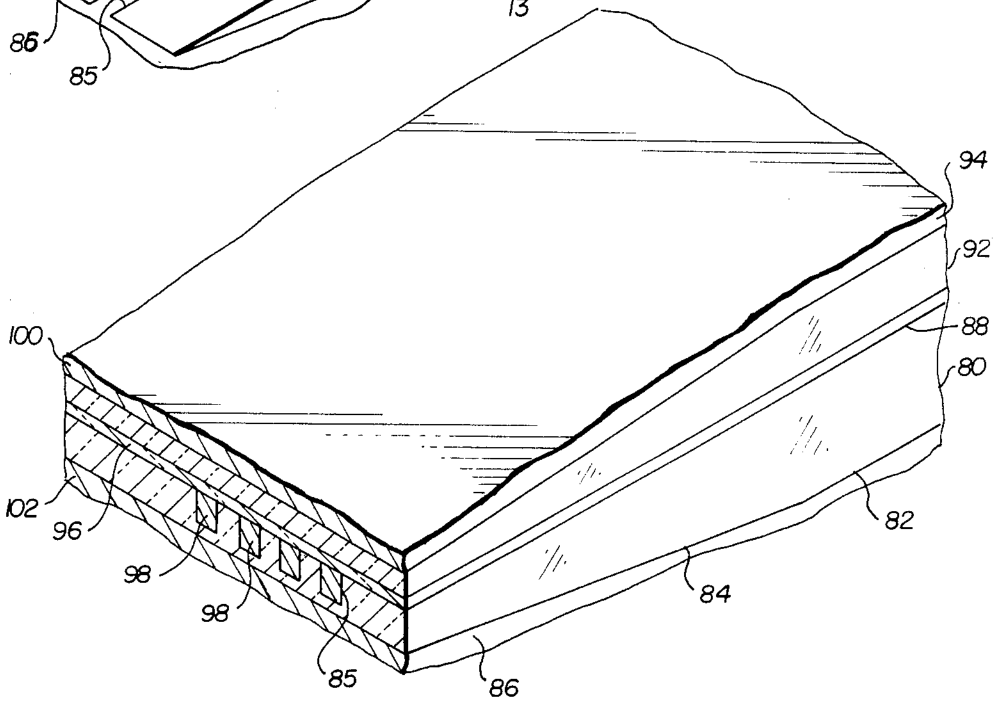
FIG 13

ELECTROLYTIC PRINTING HEAD

DESCRIPTION

1. Technical Field

The present invention concerns an improved electrolytic printing head, preferably of the type comprising non-consumable electrodes.

2. Background Art

Electrolytic printing apparatuses have been known for a number of years and generally may be divided into two classes, those in which consumable electrodes are used and those in which nonconsumable electrodes are used. In consumable electrode apparatuses, metallic ions from selected ones of the electrodes are introduced into the record medium where they are either combined with colorless materials already present in the record medium in order to form colored dots or are precipitated as fine metallic particles which form the desired colored dots. Because the electrodes are consumed in such apparatuses, they must be periodically replaced or electrode feeding mechanisms must be provided. In apparatuses using non-consumable electrodes, the record medium is marked by electrolytic modification of materials present in the record medium which materials change color upon the passage of electric current through the record medium.

In electrolytic printing apparatuses using non-consumable electrodes, the flatness of the printing surface where the electrodes or styli contact the record medium and the geometric arrangement of the styli themselves must be held to extremely tight tolerances over distances of as much as 10 inches or so if adequate printing quality is to be achieved. Thus, it is desirable that the material of the styli and the surrounding material in which the styli are retained should have very low and quick similar wear rates so that surface flatness can be maintained. And, to provide the desired geometric arrangement of the styli, it would be desirable to use the very precise material deposition and cutting techniques developed for integrated circuits in order to produce the printing head.

A variety of electrolytic printing head designs have been tried in the past, including double layer metallized ceramic structures and multi-layer ceramic structures. To provide adequate wear resistance for the styli, various metallized ceramic compounds have been tried for at least the tips of the styli; however, the very high sintering temperatures for such metallized ceramics have been found to cause degradation of the metallized connections used elsewhere in the printing head to connect the styli to exterior control circuitry. Multi-layer ceramic designs have achieved a certain degree of success but generally have not been able to satisfy the previously mentioned tolerance requirements for flatness at the printing surface and geometric arrangement of the electrodes.

U.S. Pat. No. 3,718,936, granted to Rice, discloses an electrostatic printing head formed from a plurality of stacked printed circuit boards. The writing styli were copper which has poor wear resistance. U.S. Pat. No. 3,808,675, granted to Iiyama et al disclosed a method for manufacturing electrostatic printing heads of the type comprising copper styli supported in a plastic matrix. U.S. Pat. No. 3,948,706, granted to Schmeckenbecher, disclosed a method for metallizing ceramic sheets in which a masking technique was used to deposit a conductive metal paste on a cast-in-place ceramic sheet. U.S. Pat. No. 3,965,479, granted to Sakamoto et al, disclosed a multi-stylus printing head in which rod-like styli are placed in parallel grooves in a substrate and then clamped in contact with a flat cable.

An article entitled "Method for Making a Print Head Array for an Electrolytic Printer" was published by Kuntzleman et al in IBM Technical Disclosure Bulletin, Vol. 24, No. 10, March 1982, pages 5072–5074. A planar arrangement of electrodes was embedded in a thin film of sputtered glass ceramic. The upper surfaces of the electrodes were ruthenium dioxide applied by sputtering. Experimentation with such a printing head has shown that ruthenium dioxide deposited by sputtering is relatively soft and wears away rather easily. An article entitled "High Resolution Matrix Print Element Structure and Method for Manufacturing the Structure" was published by Powell et al in IBM Technical Disclosure Bulletin, Vol. 24, No. 10, March 1982, pages 5075–5077. The printing styli comprised ruthenium dioxide which had been sintered in place on top of a copper layer. Since ruthenium dioxide and copper are incompatible at the sintering temperatures for ruthenium dioxide, such a combination would produce oxidation of the copper or reduction of the ruthenium dioxide, depending upon the ambient gases and temperature.

An article entitled "Electroformed Print Head Array" was published by Pittwood in IBM Technical Disclosure Bulletin, Vol. 24, No. 11a, April 1982, pages 5508–5510. The head included a batch fabricated array of electrodes coated with ruthenium dioxide pads supported by an underlying layer of electro-formed nickel. An article entitled "Integrated Multiple Row Print Head" was published by Pawletko et al in IBM Technical Disclosure Bulletin Vol. 24, No. 11b, April 1982, pages 5951–5952. The styli were electro-formed, made from refractory paste or constructed using metallized ceramic techniques.

SUMMARY OF THE INVENTION

The primary object of the present invention is to provide an improved electrolytic printing head having nonconsumable styli in which the materials of the styli and the materials supporting the styli are very wear-resistant.

Another object of the invention is to provide such a printing head and method of manufacture in which the printing styli can be formed prior to the application of electrical conductors to the printing head so that high temperature formation of the styli is feasible.

Yet another object of the invention is to provide such a printing head and method of manufacture in which establishment of precise geometric relationships among the styli is facilitated during manufacture.

A further object of the present invention is to provide such a printing head and method of manufacture in which the flatness of the printing surface can be maintained within tight tolerances over extended lengths of printing surface.

A still further object of the present invention is to provide such a printing head and method of manufacture in which the printing styli and the reference electrode or electrodes for the styli are incorporated into the printing head itself, thus eliminating the need for a conductive layer in the record medium.

These objects of the invention are given only by way of example; therefore, other desirable objectives and advantages inherently achieved by the disclosed structure and method may occur or become apparent to those skilled in the art. Nonetheless, the scope of the invention is to be limited only by the appended claims.

Printing heads according to the invention are adapted for use in electrolytic printers of the type in which a record medium is drawn across a plurality of electrically conductive printing styli and an electrical potential is applied to selected ones of the styli to cause current to flow through and produce a mark on selected portions of the record medium. In accordance with the invention, such a printing head comprises a first lamina of electrically insulative material, the first lamina having an edge surface for contacting a record medium during use of the printing head. Preferably, the edge surface is planar. In this specification, the term "lamina" is used in its conventional sense to mean a thin plate or layer of material. Such a lamina may be self-supporting and monolithic or so thin as to require support by another lamina or similar structure. The laminae may be secured to each other using various deposition techniques to produce successive laminae in place or using suitable adhesives to secure previously formed laminae to each other.

A plurality of electrically conductive printing styli are supported at one side of the first lamina, the printing styli terminating at and forming continuations of the edge surface for contacting a record medium during use of the printing head. The material of the styli and of the insulative material surrounding the styli are chosen to have very similar, low wear rates and high corrosion resistance. A second lamina of electrically conductive material is supported on the other side of the first lamina. The second lamina terminates at and forms a continuation of the edge. As a result, the second lamina can function as a reference electrode when an electrical potential is applied between selected ones of the printing styli and the second lamina. A third lamina of electrically insulative material may be supported on the second lamina so that the second lamina is electrically insulated by the first and third laminae. This structure along, comprising a single reference electrode and array of styli, will function as a printing head. However, it is preferred to provide a fourth lamina of electrically insulative material supported on the styli, the fourth lamina terminating at and forming a continuation of the edge surface.

In some applications, it is desired to provide reference electrodes on both sides of the styli. Thus, the printing head according to the invention may comprise a fifth lamina of electrically conductive material supported on the fourth lamina, this fifth lamina terminating at and forming a continuation of the edge surface. Where two rows of styli are desired, a printing head according to the invention may comprise a sixth lamina of electrically insulative material supported on the fifth lamina, the sixth lamina also terminating at and forming a continuation of the edge surface. A second plurality of electrically conductive printing styli may be supported at one side of the sixth lamina and a seventh lamina of electrically insulative material may be supported at one side of the second plurality of styli. Preferably, the seventh lamina also terminates at and forms a continuation of the edge surface. Finally, an eighth lamina of electrically conductive material may be supported on the other side of the seventh lamina. Such an eighth lamina functions as a further reference electrode for the second plurality of styli. In the preferred embodiment of the invention, the electrically conductive laminae and the styli are made from a mixture of ruthenium oxide and glass applied by spin-coating techniques and the electrically insulative laminae are made from glass or ceramic.

In another embodiment of the invention, the printing styli reside in slots which extend partially through the thickness of the first lamina. Also in this embodiment, the second lamina resides in a slot extending partially through the thickness of the first lamina but from the other side. A further lamina of electrically insulative material is supported on the first lamina to cover the styli in their slots. To provide a reference electrode, yet another lamina of electrically conductive material can be supported on the further lamina which covers the styli. This other lamina of electrically conductive material may extend partially through the thickness of the further lamina at the edge surface.

An electrolytic printing head is manufactured in accordance with the invention by providing a first, support lamina of electrically insulative material and applying to the support lamina a second lamina of electrically conductive material. A third lamina of electrically insulative material is applied to the second lamina and a fourth lamina of electrically conductive material is applied to the third lamina. The laminae may be applied to one another by any convenient technique using suitable adhesives; however, due to the desirable thinness of the laminae in most applications, spin coating or centrifugal deposition processes are preferred for applying laminae to the support lamina.

After the stack of laminae has been assembled, a plurality of parallel grooves are cut through the thickness of the fourth lamina to define a plurality of electrically conductive styli between the grooves. The grooves are then filled and the fourth lamina is covered with an electrically insulative material such as a seal glass to electrically insulate the styli from one another. Finally, an edge of this initial stack of laminae is finished by lapping or grinding as necessary to define an edge surface to which at least the electrically conductive laminae and the styli extend for contacting a record medium during use of the printing head. Although it is preferred that the printing surface be planar, it is also within the scope of the invention to shape the printing surface convexly. Preferably the step of covering the fourth lamina is completed prior to the cutting step by applying to the fourth lamina a fifth lamina of electrically insulative material. Thus, when the grooves are filled with electrically insulative material such as sealing glass, the portions of the fifth lamina remaining after cutting of the grooves and the sealing glass together form a lamina of electrically insulative material.

By following the steps described thus far, a printing head having a single row of styli and a single reference electrode is produced. Where a further reference electrode is desired on the other side of the row of styli, a self-supporting lamina of electrically conductive material is secured to the first stack of laminae to close the grooves, using the same electrically insulative material used for filling the grooves. Where two rows of staggered printing styli are desired, a second stack of laminae is produced following the previously described process and is secured to the exposed side of the self-supporting lamina of electrically conductive material, opposite to the first stack of laminae. In the various embodiments of the invention, the cutting step preferably produces grooves with essentially parallel sides so that the styli are essentially rectangular in cross-section, a feature which is believed to improve the flow of electrical current through the printing surface of each styli.

In accordance with another embodiment of the invention, a first support lamina of electrically insulative material is provided and a plurality of parallel grooves are cut into one surface of the first lamina so that the grooves extend from one edge of the lamina across only a portion of the width of the lamina. These grooves define locations for a plurality of electrically conductive styli. On the other side of the first lamina, a first slot is cut which extends transverse to the direction of the parallel grooves and defines a location for a reference electrode. The grooves and the slot are then filled with an electrically conductive material to define a first reference electrode in the first slot and a plurality of printing styli in the grooves. Preferably, filling of the grooves and slot is accomplished by applying several coats of a slurry of ruthenium oxide and GS300 glass to the grooves and slot and firing the coating to fuse the materials. Several coatings are applied and fired until a final thick coat has been deposited over the entire surface above the grooves or the slot. Finally, the excess material is ground away from both surfaces of the first lamina to complete the filling of the grooves and slot.

Also in accordance with this second embodiment of the invention, a second support lamina is provided with a second slot cut into one of its surfaces, the second slot also being filled with an electrically conductive material in the manner previously described, to define a second reference electrode. The other surface of the second lamina is then secured to the one surface of the first lamina, thereby covering the styli already provided in the first lamina with the second lamina. As in the previously described method, an edge of this first stack of laminae is then finished to define an edge surface to which at least the styli and the reference electrodes extend for contacting a record medium during use of the printing head. If desired, a further stack of laminae can be produced in the same manner and secured to the first stack with the first reference electrodes and the other surfaces of the first laminae facing each other. Or, the second stack of laminae can be secured to the first stack of laminae with the second reference electrodes and the one surfaces of the second laminae facing each other. Rather than providing the previously mentioned second laminae of electrically insulative material with slots to define additional reference electrodes, the method according to the second embodiment of the invention also encompasses providing a second lamina of electrically conductive material and securing to the opposite surfaces of this second lamina further laminae of electrically insulative material, to define a reference electrode laminate which is positioned between a pair of the previously described first laminae to cover the styli in each first lamina.

In accordance with a further embodiment of the invention, a first support lamina of electrically insulative material is provided with a plurality of parallel grooves extending into one of its surfaces to define locations for a plurality of electrically conductive styli. These grooves are filled and a portion of the other surface of the first lamina opposite to the grooves is covered with electrically conductive material, to define a plurality of styli in the grooves and a first reference electrode on the other surface. Portions of the first lamina, the styli and the reference electrode are then removed to define an edge surface to which at least the styli and the reference electrode extend for contacting a record medium during use of the printing head. If desired, the thickness of the first lamina may be tapered along an edge at which the grooves are to be cut. To provide a second reference electrode, a second lamina of electrically insulative material is coated on one surface with electrically conductive material to define a further reference electrode and, prior to the previously described removing step, the other surface of the second lamina is secured to the one surface of the first lamina, thereby covering the styli with the second lamina. As in the previously described embodiments of the method according to the invention, two or more stacks of lamina produced in accordance with the foregoing steps may be assembled to provide a printing head comprising two or more rows of printing styli and two or more reference electrodes.

BRIEF DESCRIPTION OF THE DRAWINGS

FIGS. 10, 11 and 12 illustrate successive steps in the manufacture of the electrolytic printing head shown in FIGS. 13–15.

FIG. 13 shows a fragmentary perspective view of an electrolytic printing head according to the invention which includes a single row of styli and two reference electrodes.

BEST MODE FOR CARRYING OUT THE INVENTION

Figure 1:
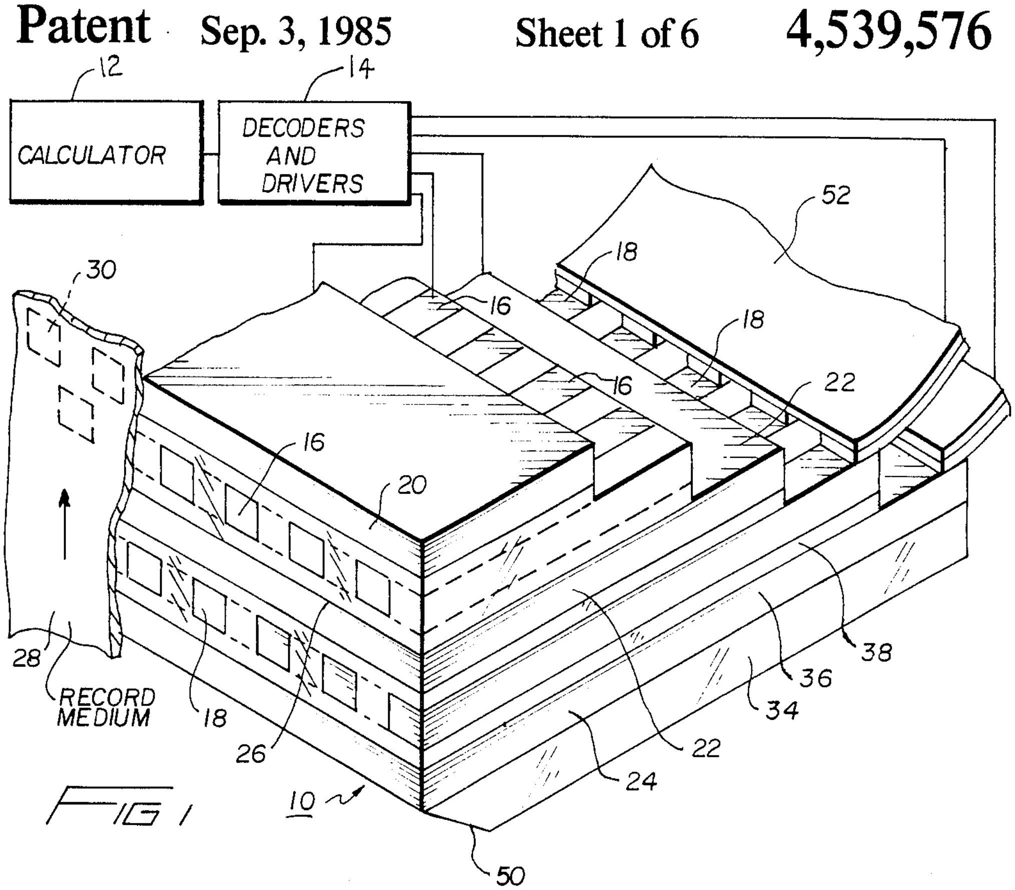
FIG. 1 shows a partially schematic perspective view of a first embodiment of an electrolytic printing head according to the invention.

The following is detailed description of the preferred embodiments of the present invention, reference being made to the drawings in which like reference numerals identify like elements of structure in each of the several Figures.

FIG. 1 shows a partially schematic perspective view of a first embodiment of an electrolytic printing head 10 according to the invention. Such a printing head might be used in a printer coupled to a calculator 12 or the like which sends printing signals to decoding and driving circuitry 14 connected in turn to a first row 16 and a second, staggered row 18 of printing anodes or styli. In the illustrated embodiment, rows 16 and 18 of printing styli are positioned between and electrically insulated from first, second and third cathodes or reference electrodes 20, 22 and 24. The styli in rows 16, 18 and the reference electrodes 20–24 extend to and form portions of an essentially planar printing surface 26. During printing, a suitable electrolytic record medium 28, shown only fragmentarily, is drawn over printing surface 26. When electrical potential is applied between selected electrodes in rows 16, 18 and an adjacent one or more of reference electrodes 20–24, tiny images in the form of dots 30 (shown in phantom) are formed in the surface of record medium 28 which contacts printing surface 26. All of the embodiments of the electrolytic printing head according to the invention are used in essentially the same manner.

Figure 2:
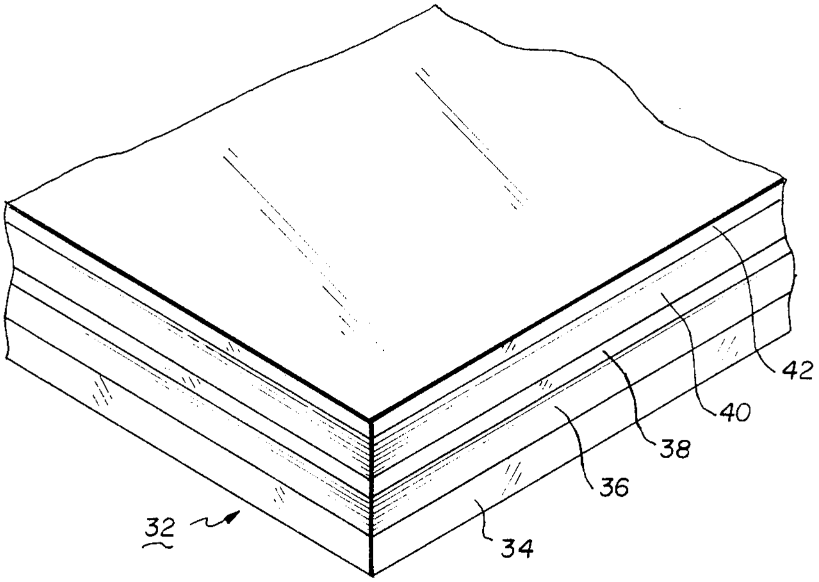
FIG. 2 shows a perspective, fragmentary view of a stack of laminae used during the manufacture of the embodiment shown in FIG. 1.

FIG. 2 illustrates a fragmentary perspective view of a stack 32 of laminae which is the starting material for manufacturing a printing head of the type shown in FIG. 1. Stack 32 comprises a substrate 34, such as a self-supporting lamina of electrically insulative ceramic like aluminum oxide, having a thickness of approximately 0.100 inch. A lamina 36 of electrically conductive material such as a mixture of ruthenium dioxide and a glass such as GS300 is applied to substrate 34, preferably by spin coating or centrifugal casting techniques, and then sintered. GS300 is a highly corrosion resistant glass available in powder form from the Owens-Illinois Company of Toledo, Ohio. Its composition by weight is 15.6% zirconia, 67.2% silica, 10.5% sodium oxide, 3.93% potassium oxide, 1.04% alumina, 0.67% lithia and 1.06% trace elements. Approximately 30 v/o ruthenium dioxide and 70 v/o GS300 are mixed with an organic carrier such as terpineol and ball milled to a paint-like consistency which is suited for centrifugal casting or coating processes. Each layer of the mixture is sintered at from 930° to 1030° C., preferably 960° C., for about ten minutes. The GS300 layers are applied similarly. Lamina 36 has a thickness of 0.010–0.012 inch and, in the completed printing head, serves as reference electrode 24 shown in FIG. 1.

A lamina 38 of electrically insulative material such as GS300 is applied in the same manner to lamina 36. Lamina 38 has a thickness of approximately 0.002 inch and electrically insulates the styli in row 18 from the reference electrode 24 in the embodiment of FIG. 1. A further lamina 40 of electrically conductive material, typically of the same composition as lamina 36, is applied in the same manner. Lamina 40 has a thickness of about 0.006 inch and provides the base material for the rows 16, 18 of styli in the embodiment of FIG. 1. Finally, a lamina 42 of electrically insulative material is applied to lamina 40, typically using the same materials and process as for lamina 38. Lamina 42 has a thickness of about 0.002 inch and provides base material for electrically insulating the styli from the reference electrodes 22 in the embodiment of FIG. 1.

Figure 3:
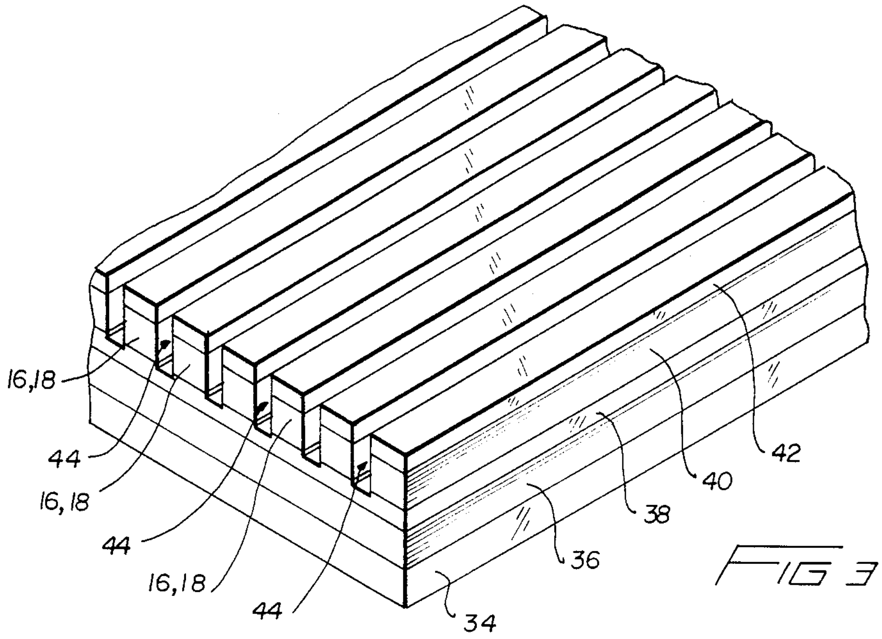
FIG. 3 shows the stack of laminae according to FIG. 2 after grooves have been cut to define printing styli.

FIG. 3 shows a perspective view of stack 32 after a plurality of parallel grooves 44 have been cut into the stack. These grooves may be formed using well-known techniques such as laser or electron beam scribing or conventional dicing saws and extend downward through stack 32 just past the lower edge of lamina 40. As a result, elongated parallel segments of lamina 40 are defined which comprise the styli of rows 16, 18 in the completed printing head according to FIG. 1. Styli having about a 0.006 inch square cross-section preferably are produced when grooves 44 are cut. However, styli as small as 0.002 inch square can be produced in this manner. If grooves 44 were now filled with an electrically insulative material such as sealing glass, a useful electrolytic printing head would be formed, having a single row of styli and a single reference electrode. Alternatively, GS300 glass may be used to fill the grooves by a multiple coat and sinter process at temperatures of 800°–900° C.

Figure 4:
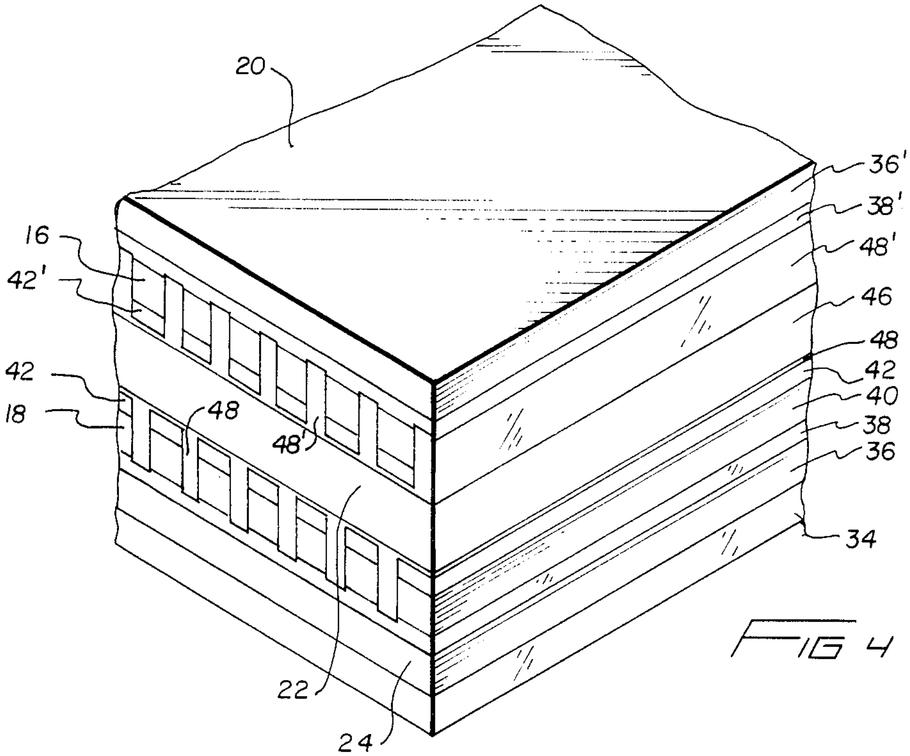
FIG. 4 shows two of the stacks of grooved laminae according to FIG. 3 secured to opposite sides of a central reference electrode.

However, in the embodiment of FIG. 1, two staggered rows of styli and three reference electrodes are used. To provide this structure, as shown in FIG. 4, a self-supporting lamina 46 of electrically conductive material such as ruthenium dioxide and GS300 is cut from a sintered block of the mixture and then secured to the upper surface of lamina 42 of the first stack of laminae shown in FIG. 3 by means of a layer 48 of electrically insulative material such as sealing glass, which also extends into and fills slots 44 to electrically insulate styli 16, 18 from one another. Sealing glass is low melting point glass suitable for securing one glass or ceramic object to another, as will be understood by those skilled in the art. In the embodiment of FIG. 1, lamina 46 has a thickness of about 0.020 inch and becomes reference electrode 22. Alternatively, if the grooves were filled with GS300 glass, then the structure would be sealed together by aligning the components and applying heat and pressure at 800°–900° C. Pressures in the range of about 25–150 gms/cm$^2$ have been found suitable for this purpose.

Because sealing glass 48 and lamina 38 are both electrically insulative materials, they function in the completed printing head as a single insulative lamina which supports the printing styli of rows 16, 18 on one side thereof. That is, the portion of sealing glass 48 in grooves 44 below lamina 42 and lamina 38 function as such a single insulative lamina. In a similar fashion, the remaining portions of lamina 42 on the tops of styli of rows 16, 18 and the remainder of sealing glass 48 function in the completed printing head as a single insulative lamina. The structure thus far defined with reference to FIG. 4 can be used as a printing head with a single row 18 of styli and two reference electrodes 22, 24. To provide an additional, staggered row 16 of styli, a second stack of laminae of the type shown in FIG. 3 is manufactured having a lamina 36′ of electrically conductive material, a lamina 38′ of electrically insulative material, a row 16 of styli, a lamina 42′ of electrically insulative material and sealing glass 48′ of electrically insulative material. This second stack of laminae is secured using sealing glass 48′ to the upper surface of self-supporting lamina 46 to complete the structure shown in FIG. 4. Electrically conductive lamina 36′ becomes reference electrode 20 in the embodiment of FIG. 1.

Returning now to FIG. 1, the substrate 34 may be chamfered as indicated at 50 to facilitate leading the record medium into contact with printing surface 26. Also, the various laminae may be cut away to define steps which reveal the upper surfaces of the styli in rows 16, 18 and the upper surfaces of the reference electrodes 22, 24 to facilitate connection to decoding and driving circuitry 14. For this purpose, conventional flat cables 52 may be used in the familiar manner. Printing surface 26 is finished by removing portions of the various laminae by lapping or grinding to define an edge plane to which at least the styli in rows 16, 18 and reference electrodes 20, 22, 24 extend in order to contact record medium 28 during use of the printing head.

Figure 5:
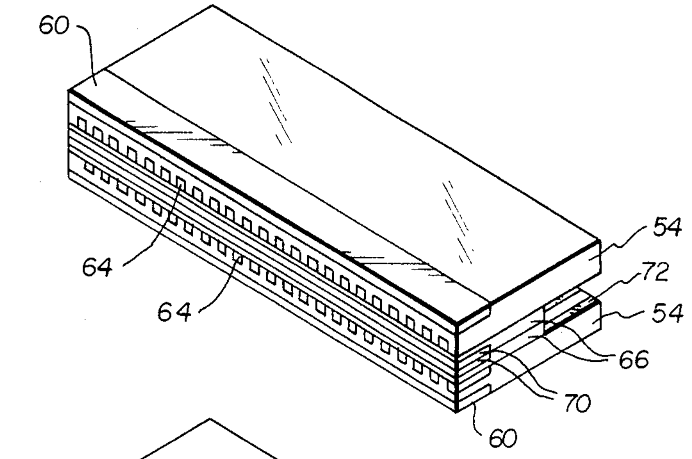
FIG. 5 shows a perspective view of a second embodiment of an electrolytic printing head according to the invention.
Figure 6:
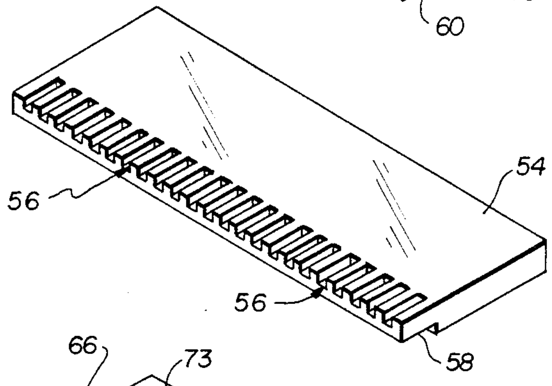
FIG. 6 shows a perspective view of a grooved and slotted self-supporting lamina used during manufacture of the embodiment of FIGS. 5, 7 and 8.

FIG. 6 shows a perspective view of a self-supporting lamina 54 of electrically insulative material such as a ceramic. Alumina, glass ceramic or other dielectric material may be used. Lamina 54 may be 0.020 inch thick and forms the stock material for manufacture of the embodiments of FIGS. 5, 7 and 8. A plurality of parallel grooves 56 are cut into lamina 54 by suitable known techniques of the type previously described in such a way that the grooves extend only partway through the thickness of lamina 54 and only partway across one of its surfaces. Grooves 56 may be 0.005 inch square and 0.100 inch long and define locations for electrically conductive printing styli. On the opposite surface of lamina 54, a slot 58 is provided which extends transversely to the direction of grooves 56 to define a location for a reference electrode of approximately the same width as the length of grooves 54 and the same length as that of lamina 54 and about 0.012 inch deep. Grooves 56 and slot 58 are then filled with an electrically conductive material such as a mixture of ruthenium dioxide and GS300. To accomplish this filling, an initial wet coat of a slurry of ruthenium dioxide and GS300 is applied to the walls of the grooves and slot by filling them with the slurry and blowing out the excess material. The composition of the slurry preferably is the same as that used for spin coating the laminate shown in FIG. 2. Brushing or spray coating techniques also may be used. The initial coat is then fired to fuse its constituents. Further coats are deposited by filling the slots with the slurry and firing until the grooves and the slot are essentially filled. Then, a final thick coat is deposited over the entire surface of the lamina 54 and fired. The excess material is then ground away to define the printing styli within grooves 56 and the reference electrode within slot 58. If desired, the reference electrode may be cut from a slab of material and glued in the slot 58.

Figure 7:
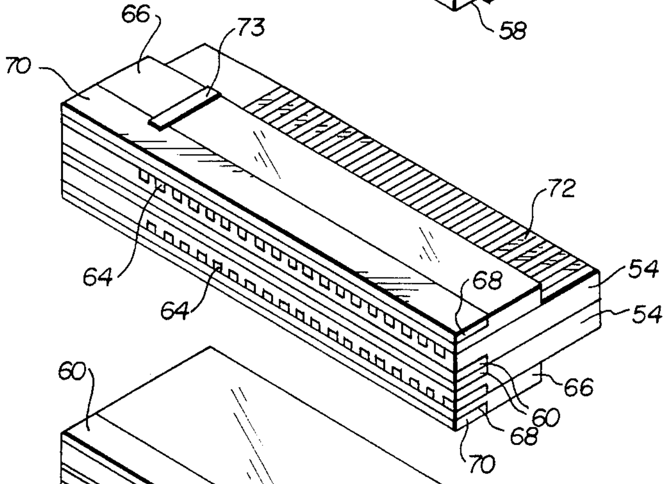
FIG. 7 shows a perspective view of a further embodiment of an electrolytic printing head according to the invention.

An additional reference electrode is prepared for the embodiments of FIGS. 5 and 7 by providing a lamina 66 of electrically insulative material, shown most clearly in FIG. 7, which is approximately half as wide and half as thick but of the same length as lamina 54. A slot 68 is cut into lamina 66 along its length to define a location for another reference electrode 70 which may be deposited using the same process previously discussed for grooves 56 and slot 58. Alternatively, a slab of commercially available hot-pressed titanium carbide may be used for reference electrode 70 and simply glued in place using epoxy. Titanium carbide is much harder than the mixture of ruthenium dioxide and glass, however, so that rather uneven wear must result. Metal conductor tracks 72 can be deposited on lamina 54 to provide convenient connection points for each of the styli 64, as indicated partially in FIGS. 5, 7 and 8. Conventional chromium-copper deposition techniques may be used for conductor tracks 72.

In the embodiment of FIG. 5, the assembly of lamina 66 and reference electrode 70 is secured to the assembly of lamina 54, reference electrode 60 and styli 64 using a suitable adhesive such as a sealing glass or epoxy, so that the surface of lamina 66 opposite to reference electrode 70 faces and covers styli 64, to produce an electrolytic printing head having a single row of styli with reference electrodes on either side. A similar stack of elements 54–70 is then prepared and secured to the existing stack so that the surfaces of lamina 66 including reference electrodes 70 contact each other. The two stacks of laminae may be joined to each other using epoxy cements or sealing glass, as preferred.

In the embodiment of FIG. 7, a pair of assemblies of elements 54–70 are secured to each other so that the surfaces of laminae 54 including reference electrodes 60 are joined to each other, using a suitable adhesive such as epoxy. In this embodiment, it may be desirable to deposit on laminae 66 one or more conductors 73 to facilitate connection of decoding and driving circuitry.

Figure 8:
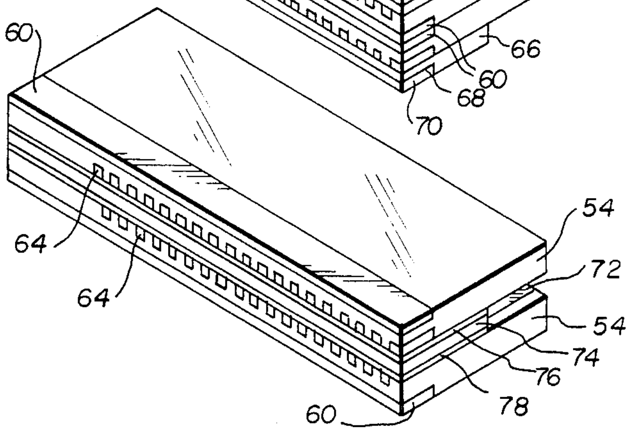
FIG. 8 shows a perspective view of yet another embodiment of an electrolytic printing head according to the invention.

In the embodiment of FIG. 8, a self-supporting lamina 74 of electrically conductive material is provided and a pair of laminae 76, 78 of electrically insulative material are secured to the opposite surfaces of lamina 74. Then, the stack of laminae 74–78 is sandwiched between two assemblies of elements 54, 60 and 64.

Figure 9:
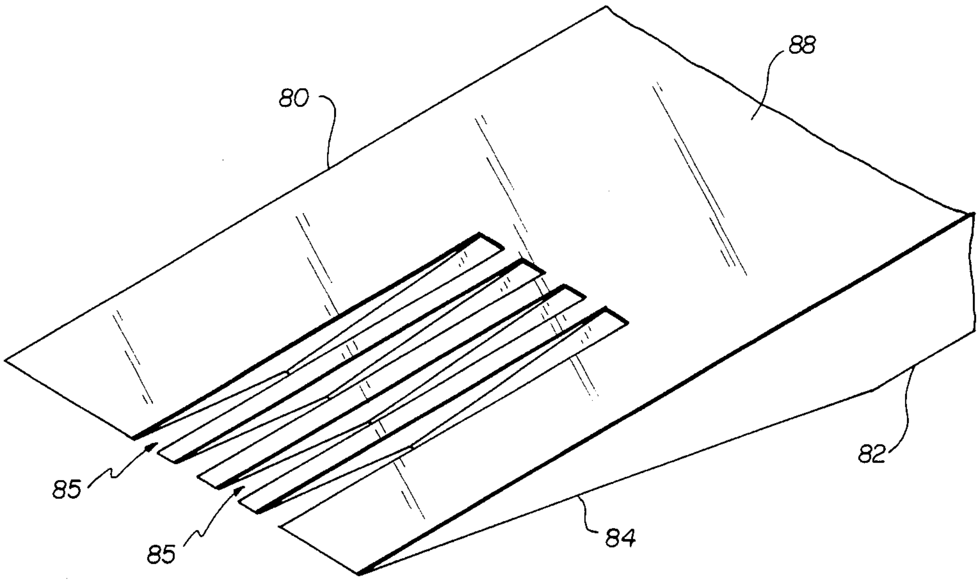
FIG. 9 shows a fragmentary perspective view of a self-supporting lamina used during manufacture of the embodiments of the invention shown in FIGS. 13–15.
Figure 10:
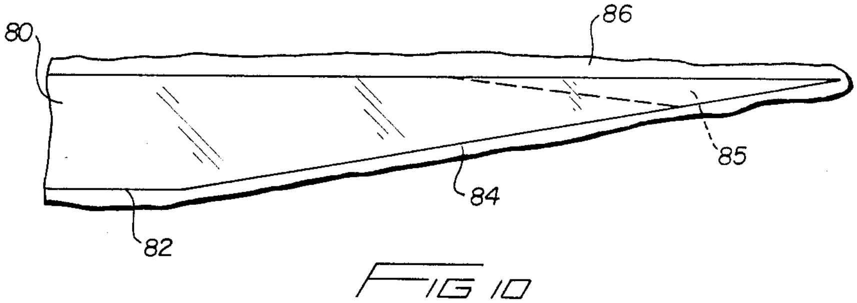
Figure 11:
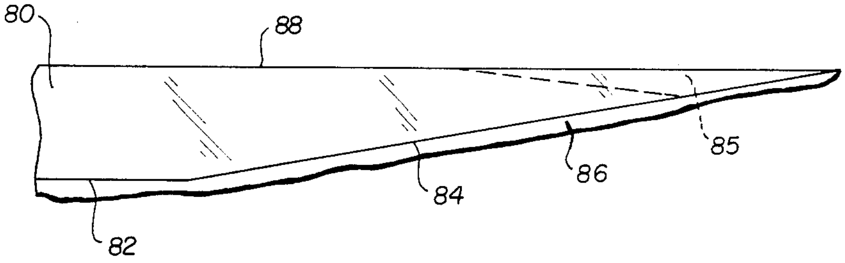

FIGS. 9 to 15 illustrate further embodiments of an electrolytic printing head according to the invention in which a self-supporting lamina 80 of electrically insulating material such as a ceramic is used as the primary support material for the printing head. Although it is not required for these embodiments of the invention, the thickness of lamina 80 may be tapered from lower surface 82 at 84. At 3° to 5° bevel is preferred. Then, using means such as a conventional dicing saw, a plurality of grooves 85 are cut into the tapered edge of lamina 80 so that approximately half of the length of each groove extends completely through lamina 80 in its tapered portion and half of the length of the groove extends only partway through lamina 80. Grooves 85 define locations for the printing styli. For 125 styli per inch, 0.004 inch slots on 0.008 inch centers could be used, for example. For 250 styli per inch, 0.002 inch slots on 0.004 inch centers could be used. Then, the grooved structure shown in FIG. 9 is dipped into a wet mixture of ruthenium dioxide and GS300 to define a covering layer 86 as shown in FIG. 10 which not only covers the upper and lower surfaces of lamina 80 but also fills grooves 85. After firing, coating 86 is ground away from the upper surface 88 of lamina 80 to leave the coating material only on the bottom surface of lamina 80 and in grooves 85. At this point, conductors 90 may be deposited on upper surface 88 to provide convenient points for electrical connection to the styli being formed in grooves 85. If the structure shown in FIG. 12 were cut along line 13—13, a usable electrolytic printing head would be defined which has a single row of styli in grooves 85 and a single reference electrode in covering layer 86.

In applications where reference electrodes are desired on both sides of the styli, a further lamina 92 of electrically insulating material may be coated, as shown in FIG. 13, with a layer 94 of electrically conductive material, using a dipping, firing and grinding process of the type previously described. The underside of lamina 92 may then be secured to the upper surface of lamina 80 using a suitable adhesive such as a layer of sealing glass or epoxy 96. Then, the tip of the structure thus far described is removed essentially along line 13—13 of FIG. 12 to reveal the end surfaces of a plurality of styli 98 and first and second reference electrodes 100, 102 on either side of the styli. The location of line 13—13 preferably is chosen so that the styli have a depth approximately equal to their width. The end surfaces of the styli, reference electrodes and laminae are then ground to define a suitable printing surface.

Figure 14:
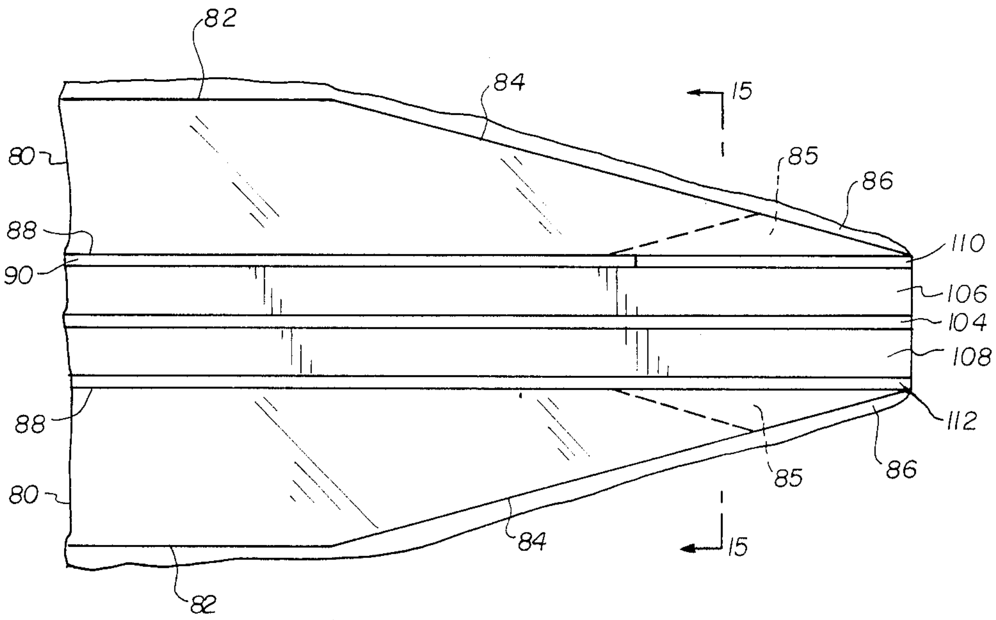
FIG. 14 shows a side elevation view of an intermediate form of yet another embodiment of an electrolytic printing head according to the invention which includes two staggered rows of styli and three reference electrodes.
Figure 15:
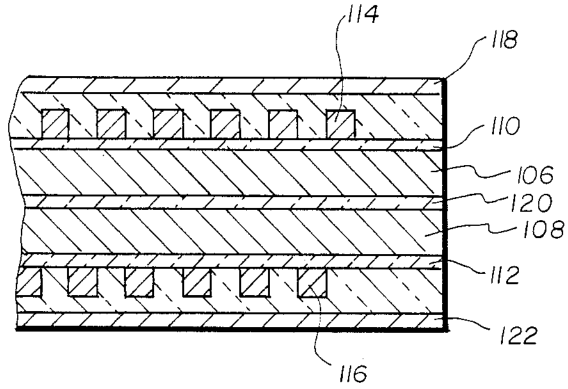
FIG. 15 shows a fragmentary view taken along line 15—15 of FIG. 14 illustrating the configuration of styli and reference electrodes at the printing surface.

FIGS. 14 and 15 show yet another embodiment of an electrolytic printing head according to the invention. An electrically conductive lamina 104 made from a material such as rubidium, nickel or platinum, is sandwiched between a pair of lamainae 106, 108 of an electrically insulating material such as Kapton. The assembly of elements 104–108 is then sandwiched between two of the assemblies shown in FIG. 12 by means of layers 110, 112 of a suitable adhesive such as epoxy. The end of the assembly shown in FIG. 14 is then removed at line 15—15 to reveal a rough-cut printing surface as shown in FIG. 15. Two staggered rows, each comprising a plurality of styli 114, 116 are positioned between and electrically insulated from reference electrodes 118, 120 and 122. The rough-cut printing surface is then ground and lapped as necessary to define the preferred flat printing surface.

Having thus described our invention in sufficient detail to enable those skilled in the art to make and use it, we claim as new and desire to secure Letters Patent for:

1. An improved electrolytic printing head having nonconsumable styli, for use in electrolytic printers of the type in which a record medium is drawn across a plurality of electrically conductive printing styli and an electrical potential is applied to selected ones of the styli to cause current to flow through and produce a mark on selected portions of the record medium, said printing head comprising:

a first lamina of electrically insulating corrosion resistant glass, said first lamina having an edge surface for contacting a record medium during use of said printing head;

a plurality of elongated electrically conductive printing styli each of which is fabricated of a mixture of ruthenium dioxide and corrosion resistant glass, said styli being supported at one side of said first lamina between a plurality of elongated grooves that are disposed in spaced parallel relation to one another and extend into said first lamina, said elongated printing styli terminating at and forming continuations of said edge surface for contacting a record medium during use of said printing head; and a second lamina of electrically conductive material supported on the other side of said first lamina, said second lamina terminating at and forming a continuation of said edge surface for contacting a record medium during use of said printing head, said second lamina being fabricated of a mixture of ruthenium dioxide and corrosion resistant glass and being operative to function as a reference electrode when an electrical potential is applied between selected ones of said printing styli and said second lamina;

surface portions of said styli and of said second lamina remote from said edge surface being exposed to permit electrical connections to be made to said styli and to said reference electrode, and conductor means carried by and confined in extent to said exposed surface portions for making said electrical connections.

2. A printing head according to claim 1, further comprising a third lamina of electrically insulating material supported on the side of said second lamina opposite to said first lamina, said third lamina terminating at said edge surface, whereby said second lamina is electrically insulated by said first and third laminae.

3. A printing head according to claim 2, further comprising a fourth lamina of electrically insulating material supported on said styli, portions of said fourth lamina extending between said styli to insulate said styli from one another, said fourth lamina terminating at and forming a continuation of said edge surface for contacting a record medium during use of said printing head.

4. A printing head according to claim 3, further comprising a fifth lamina fabricated of an electrically conducting mixture of ruthenium dioxide and corrosion resistant glass, said fifth lamina being supported on said fourth lamina, said fifth lamina terminating at and forming a continuation of said edge surface for contacting a record medium during use of said printing head, said fifth lamina being operative to function as a further reference electrode when an electrical potential is applied between selected ones of said printing styli and said fifth lamina.

5. A printing head according to claim 2, wherein said third lamina is tapered to terminate at said edge surface.

6. A printing head according to claim 4, further comprising a sixth lamina fabricated of an electrically insulating corrosion resistant glass, said sixth lamina being supported on said electrically conducting fifth lamina, said sixth lamina terminating at and forming a continuation of said edge surface; a second plurality of electrically conductive printing styli supported at one side of said sixth lamina, each of said second plurality of styli being fabricated of a mixture of ruthenium dioxide and corrosion resistant glass; a seventh lamina of electrically insulating corrosion resistant glass supported at one side on said second plurality of styli, said seventh lamina terminating at and forming a continuation of said edge surface; and an eighth lamina of electrically conductive material supported on the other side of said seventh lamina, said eighth lamina terminating at and forming a continuation of said edge surface, said eighth lamina being fabricated of a mixture of ruthenium dioxide and corrosion resistant glass and being operative to function as a reference electrode when an electrical potential is applied between selected ones of said printing styli and said eighth lamina.

7. A printing head according to claim 6, wherein said third lamina is tapered to terminate at said edge surface.

8. A printing head according to claim 6, wherein portions of said sixth lamina extend between said second plurality of styli to electrically insulate said second styli from each other.

9. A printing head according to claim 1, wherein said grooves extend only partially through the thickness of said first lamina.

10. A printing head according to claim 1, wherein said second lamina resides in a slot extending partially through the thickness of said first lamina at said edge surface.

11. A printing head according to claim 9, further comprising a third lamina of electrically insulating glass supported on said first lamina and said styli, said third lamina terminating at said edge surface, said styli being electrically insulated by said first and third lamina.

12. A printing head according to claim 11, further comprising a fourth lamina fabricated of an electrically conductive mixture of ruthenium dioxide and glass, said fourth lamina being supported on said third lamina, said fourth lamina residing in a slot extending partially through the thickness of said third lamina at said edge surface.

13. A printing head according to claim 11, further comprising a fourth lamina fabricated of an electrically conductive mixture of ruthenium dioxide and corrosion resistant glass, said fourth lamina being supported on said third lamina.

14. A printing head according to claim 9, wherein said first lamina is tapered to terminate at said edge surface.

15. A printing head according to claim 14, further comprising a third lamina of electrically insulating material supported on said styli and said first lamina, said third lamina terminating at said edge surface, said styli being electrically insulated by said first and third laminae.

16. A printing head according to claim 15, further comprising a fourth lamina fabricated of an electrically conductive mixture of ruthenium dioxide and corrosion resistant glass, said fourth lamina being supported on said third lamina and terminating at and forming a continuation of said edge surface, said fourth lamina being operative to function as a further reference electrode when an electrical potential is applied between selected ones of said printing styli and said fourth lamina.

17. A printing head according to claim 1, wherein said edge surface is planar.

* * * * *